(12) United States Patent
Ringelstetter et al.

(10) Patent No.: US 12,529,216 B2
(45) Date of Patent: Jan. 20, 2026

(54) PRESENCE ACTIVATED FLOW CONTROL SYSTEM

(71) Applicant: EKO TECH INC., Boise, ID (US)

(72) Inventors: Richard Ringelstetter, Boise, ID (US); Jason Ringelstetter, Boise, ID (US); Geoff Maestas, Boise, ID (US)

(73) Assignee: EKO TECH INC., Boise, ID (US)

( * ) Notice: Subject to any disclaimer, the term of this patent is extended or adjusted under 35 U.S.C. 154(b) by 0 days.

(21) Appl. No.: 19/222,926

(22) Filed: May 29, 2025

(65) Prior Publication Data
US 2025/0369212 A1  Dec. 4, 2025

Related U.S. Application Data

(60) Provisional application No. 63/653,192, filed on May 29, 2024.

(51) Int. Cl.
*E03C 1/05* (2006.01)
*E03C 1/02* (2006.01)
*E03C 1/04* (2006.01)

(52) U.S. Cl.
CPC ............ *E03C 1/057* (2013.01); *E03C 1/0408* (2013.01); *E03C 2001/026* (2013.01)

(58) Field of Classification Search
CPC ... E03C 1/057; E03C 1/0408; E03C 2001/026
See application file for complete search history.

(56) References Cited

U.S. PATENT DOCUMENTS

| 5,853,130 A * | 12/1998 | Ellsworth | E03C 1/055 239/69 |
| 8,807,521 B2 * | 8/2014 | Dunki-Jacobs | E03C 1/057 251/129.04 |
| 8,876,025 B1 | 11/2014 | Wheeler | |
| 11,045,828 B2 | 6/2021 | Floyd et al. | |
| 11,255,076 B2 | 2/2022 | Floyd et al. | |
| 2006/0006354 A1 * | 1/2006 | Guler | E03C 1/057 251/129.04 |
| 2009/0293190 A1 * | 12/2009 | Ringelstetter | E03C 1/057 4/605 |
| 2016/0258144 A1 * | 9/2016 | Tayenaka | G05D 27/02 |
| 2020/0122175 A1 | 4/2020 | Floyd et al. | |
| 2021/0270019 A1 | 9/2021 | Li et al. | |

FOREIGN PATENT DOCUMENTS

WO  2009095879 A2  8/2009

* cited by examiner

*Primary Examiner* — Christine J Skubinna
(74) *Attorney, Agent, or Firm* — Burdick Patents, P.A.; Sean D. Burdick; Colin L. Honan

(57) ABSTRACT

A system for automatically controlling the flow of water in a showering environment includes an electrically controlled valve coupling a water inlet to a discharge head. A sensor array is positioned within the showering environment and has a multitude of sensors that are each directed to sense heat from a distinct location within the showering environment. A controller coupled to the valve and sensor array receives heat signals from each sensor in the array, derives a statistic from among all of the heat signals, and opens or closes the valve according to the derived statistic.

18 Claims, 10 Drawing Sheets

| Controller Applied Logic: | Array of Passive Infared Sensors | | | | | | | |
|---|---|---|---|---|---|---|---|---|
| (-5) Off  | 1 | 1 | 1 | 1 | 1 | 1 | 1 | 1 |
| (-5) Off  | 2 | 2 | 2 | 2 | 2 | 2 | 2 | 2 |
| (-5) Off  | 3 | 3 | 3 | 3 | 3 | 3 | 3 | 3 |
| (-2) Grey$^{(-)}$ | 4 | 4 | 4 | 4 | 4 | 4 | 4 | 4 |
| (+2) Grey$^{(+)}$ | 5 | 5 | 5 | 5 | 5 | 5 | 5 | 5 |
| (+5) On  | 6 | 6 | 6 | 6 | 6 | 6 | 6 | 6 |
| (+5) On  | 7 | 7 | 7 | 7 | 7 | 7 | 7 | 7 |
| (+5) On  | 8 | 8 | 8 | 8 | 8 | 8 | 8 | 8 |
| Ignore: | X | X |   |   |   |   | X | X |

SHOWERHEAD ³

FIG. 7

PRESENCE ACTIVATED FLOW CONTROL SYSTEM

RELATED APPLICATIONS

This application claims priority to and is a continuation of U.S. Provisional Application No. 63/653,192 filed May 29, 2024, the contents of which are incorporated herein by reference.

BACKGROUND OF THE INVENTION

Field of the Invention

The present disclosure relates generally to flow control systems and, more particularly, to presence activated flow control systems for showers.

Description of Related Art

A lot of water is wasted every time a person takes a shower. In the United States, the average person uses about 25 gallons of water for every ten minutes of showering. Most of this water goes unused down the drain while the person showering is lathering away from the water flow. To make matters worse, the lost water is usually water that had been heated using energy from a water heater.

There have been previous efforts to develop a water conservation system that can be implemented in a shower. These prior art attempts, however, have been unable to accurately detect the location of a body moving within the showering space to accordingly turn the water on and off. In prior presence activated shower systems, inaccuracy predicting a body's location within the showering space causes difficulties, such as water shutting off when a water flow is needed, and vice versa.

What is needed is a flow control system for use within a showering space that can detect the presence of a body within the showering space with a high degree of reliability.

SUMMARY OF THE INVENTION

The present invention solves the above-mentioned problems by accurately predicting the person's location within the showering environment to more efficiently conserve water throughout the showering session. The disclosed invention utilizes a sensor array and a controller having specialized algorithms to derive a statistic from the heat signals received from the sensor array. The derived statistic accurately tracks an object's position within the showering environment to predict when a person is not using the water and therefore the water can be temporarily turned off. The system will continue tracking the object position within the showering environment so that water will be turned back on when the person returns to using the water.

In a first embodiment, a flow control system for a showering environment is disclosed. The showering environment includes a water inlet and a discharge head. An electrically controlled valve fluidically connects the water inlet to the discharge head. A sensor array having multiple sensors, where each sensor is directed to sense heat from a distinct location within the showering environment is included as part of the system. A power source provides power to the system, and a controller is electrically coupled to each of the sensor array, the valve, and the power source. The controller is configured to receive a heat signal from each sensor, derive a statistic from among all the heat signals and to open and close the valve according to the derived statistic.

In some embodiments, the derived statistic is a maximum temperature. In one such embodiment, the controller has a first routine stored in its memory and executable by the controller for determining object presence within the showering environment. The first routine includes: (a) defining an on zone and an off zone in the sensor array and assigning each sensor to either the on zone or the off zone; (b) receiving temperature data from each sensor in the sensor array; (c) identifying a sensor corresponding to a maximum temperature; (d) tracking movement of a location of the maximum temperature throughout the sensor array; and (e) sending a signal to the valve responsive to sensing the location of the maximum temperature within the on zone or the off zone. When the controller tracks the maximum temperature to the on zone, the valve is commanded open or maintained in its open state. Similarly, when the controller tracks the maximum temperature to the off zone, the valve is commanded closed or maintained in its closed state. Preferably, the controller repeats steps (b) through (e) until the system receives a power down signal. In further embodiments, the controller repeats steps (b) through (e) for a predetermined amount of time which only begins when the controller has determined that the location of the maximum temperature is in the off zone. At the expiration of the predetermined amount of time and if the maximum temperature has not moved out of the off zone, the system reverts to a sleep mode where no temperature data is collected. Further, during this predetermined amount time the controller is receiving data from the internal pressure sensor. If at any time the controller detects a loss in water pressure, which would indicate the main water source has been turned off, the system reverts to sleep mode. During sleep mode, if the pressure returns, as detected by the water pressure and temperature sensor, the change in pressure data will wake the system out of sleep mode.

In some embodiments, the first routine may include a warmup period prior to step (b). The warmup period involves receiving the power on signal and maintaining the system in a standby state for a preset period of time. While in the standby state, temperature data is collected and the valve is maintained in the open position but the controller does not process or execute any control routine based on the received temperature data. At the expiration of the warmup period, the controller advances to step (b) receiving the temperature data from the sensor array. In some embodiments, step (b) also includes a minimum temperature threshold so that the controller disregards temperature values that fall below the minimum temperature threshold.

Preferably, each sensor in the sensor array is a passive infrared sensor. The electrically controlled valve is preferably a magnetic latching solenoid valve.

In some embodiments, the derived statistic is a standard deviation of heat signals received from each of the sensors over a fixed time period or for a fixed number of samples. Preferably, the controller stores in its memory a second routine for tracking temperature changes sensed by each sensor. The controller is configured to execute the second routine. Preferably, the steps of the second routine include: (i) defining on rows and off rows among the sensor array and assigning each sensor to one of the on rows or one of the off rows; (ii) receiving temperature data from each sensor; (iii) storing in the memory a sequential reading of the temperature data from each sensor; (iv) calculating the standard deviation of temperature changes for each sensor based on the sequence of temperature readings for that sensor; (v)

tracking changes to the standard deviation for each sensor; (vi) determining a direction of movement of an object based on the tracked changes to the standard deviation for each sensor; and (vii) sending a signal to change the state of the valve in response to determining the direction of movement of the object within the showering environment. Preferably, steps (ii) through (vii) are repeated until the system receives a power down signal. Further, steps (ii) through (vii) may be repeated for a predetermined period of time, at the expiration of which the system reverts to a sleep mode in which no data is collected.

The second routine may also include a warmup period prior to step (ii). During the warmup period, the system is powered on and the valve is maintained in the open position but no data is being processed by the controller. The controller receives temperature data from the sensor array during the warmup period but does not utilize the data to execute any one of the control routines until expiration of the warmup period. At the expiration of the warmup period, the controller advances to step (ii) and begins collecting data.

In a more elaborate embodiment, the invention is directed to a flow control system for a showering environment that has a water inlet and a discharge head. The system includes a housing that encloses a magnetic latching valve, the valve fluidically connecting the water inlet to the discharge head. The housing further encloses a controller configured to command the valve, and a power source that provides power to the system. A boom extends upward from the housing. A sensor array is attached to an end of the boom and positioned above the discharge head. The sensor array is electrically coupled to the controller and has multiple sensors that are each directed to detect heat from a distinct location within the showering environment. The controller is configured to receive a heat signal from each of the sensors, derive a statistic from among all of the heat signals, and open or close the valve according to the derived statistic. In some embodiments, the derived statistic is a maximum temperature. Preferably, the boom is rotatably coupled to the housing. A hinge, such as a detented hinge, may rotatably couple the boom to the housing and provide a rotational span for the boom of about 90 degrees. Alternatively, the boom may extend upward from the housing at a fixed angle.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

FIG. 7 is a diagram showing a grid representation of a sensor array utilized in a flow control system according to the present invention.

DETAILED DESCRIPTION OF THE INVENTION

The following disclosure presents exemplary embodiments of a presence activated flow control system. In particular, the following disclosure provides a flow control system useful for water conservation in a showering environment. The flow control system according to the present invention is engineered to detect, automatically, the presence of a human body or other similarly substantial mass (hereafter "object") within the showering space and control a flow of water to the showering space in response to detecting the presence of that object. Further, the flow control system is engineered to track movement of the object within the showering space and to open or close a valve in response to such movement.

Figure 1:
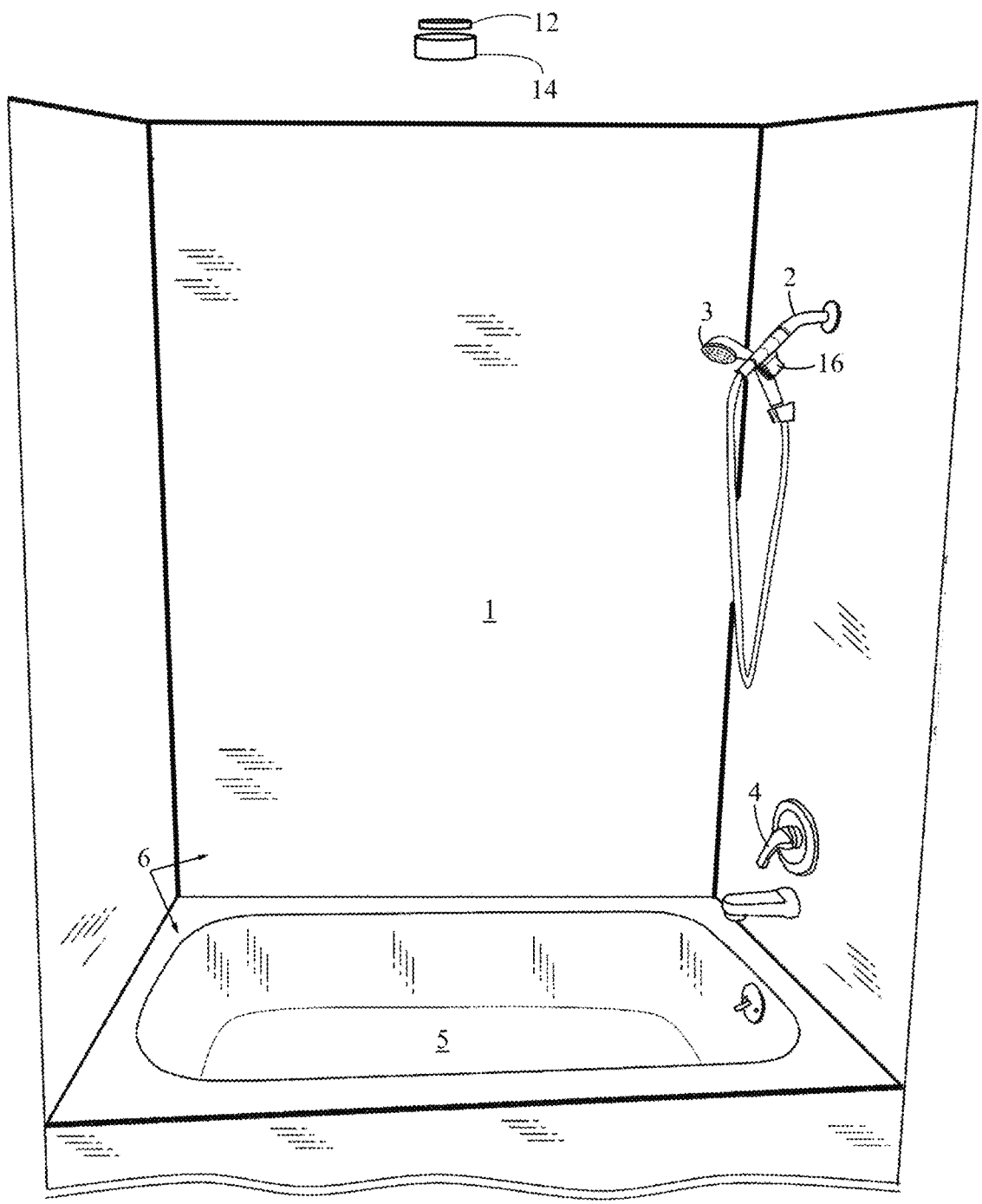
FIG. 1 is a perspective view of an embodiment of a flow control system according to the present invention deployed in a showering environment.

FIG. 1 is a perspective view of a first embodiment of a flow control system according to the present invention. A flow control system 10 includes a controller 12, an array of sensors 14 and a valve 16. A power source 18 is also included and provides the necessary electrical power to each of the controller 12, the array 14 and the valve 16. The power source 18 may also provide the necessary electrical power to a water pressure and temperature sensor that is positioned within the valve 16. The controller 12 is operatively coupled to the valve 16, which will open and close in response to signals received from the controller. The controller 12 is further operatively coupled to the array 14. The array of sensors 14 is preferably made up of passive infrared sensors configured to detect infrared radiation and communicate such detection to the controller 12. In some preferred embodiments, the array 14 is formed of an eight by eight grid of passive infrared sensors, similar to the grid illustrated in FIG. 7 below. Alternative embodiments may utilize an array of sensors 14 that is rectangular or nonrectangular in shape, and that may have greater than or less than eight sensors in any row or column, depending on the size and geometry of the showering environment in which the flow control system 10 is implemented.

FIG. 1 depicts a conventional showering space or environment 1, as would commonly be found in many residential homes. It should be understood that there are many different possible showering environments that exist and the present invention is not limited to any one type of environment. For purposes of the present invention, a showering environment 1 is understood to include a main water source 2 in fluid communication with an outlet or shower head 3. The shower head 3 is controlled by a main valve 4, which opens and closes the main water source 2 to control discharge of water from the shower head 3. The shower area 5 is defined as a surface substantially impacted by water discharged from the shower head 3. The shower area 5 is thus a two-dimensional surface, e.g., the ground, that may be occupied by a three-dimensional object, e.g., the person showering. The shower area 5 may also be thought of as the area where a person is most likely to stand while actively rinsing and washing under the flowing water and an additional area where a person is most likely to stand when lathering or shaving outside a direct path of water flow. It should be observed that the shower area 5 is unique to each showering environment 1 in that different shower heads 3 can produce different discharge patterns. Further, the shape and configuration of the enclosure 6, if one is present, may result in a change to the shower area 5. For instance, outdoor showers may utilize a shower head 3 connected to a main water source 2 and a main valve 4 with nothing else present. The shower area 5 for these types of showers is not limited by a physical structure, such as enclosure 6.

Figure 2:
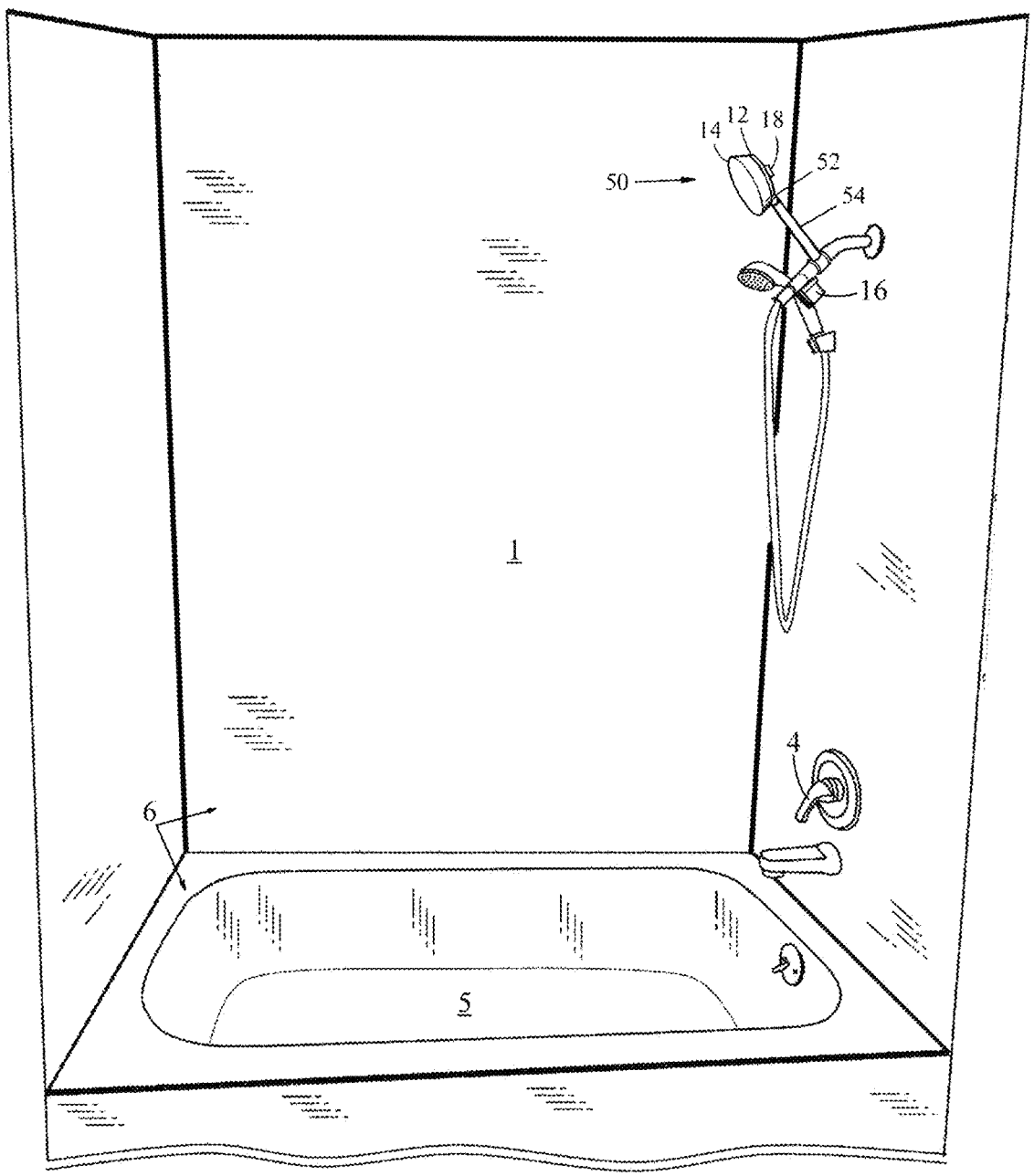
FIG. 2 is a perspective view of an alternative embodiment of a flow control system according to the present invention deployed in a showering environment.

FIG. 2 is a perspective view of an alternative embodiment of a flow control system 50 according to the present invention. The flow control system 50 utilizes many of the same components of the flow control system 10 and further includes a housing 52 which encloses all component pieces in a single enclosure. Each of the controller 12, the array of infrared sensors 14 and a power source 18 may be enclosed within the housing 52. The valve 16 may be electrically coupled directly to the controller 12 and the power source 18 via a wired connection extending through a boom or an arm 54 that is attached to the housing 52.

Alternatively, in either of the flow control systems 10 and 50, the valve 16 may be electrically coupled to a wireless receiver configured to communicate with the controller 12. In some embodiments, communication between the controller 12 and a wireless receiver may be accomplished using Bluetooth® communication or another wireless communication protocol.

In some more elaborate embodiments of the flow control systems 10 and 50, there may be an additional sensor positioned directly in the main water source 2 and in electrical communication with the controller 12. The in-line sensor may be configured to detect water pressure and water temperature in the main water source 2 and communicate such information to the controller 12. Preferably, the in-line sensor is positioned upstream from the valve 16. In another embodiment, the in-line sensor is installed within the body of valve 16.

Figure 3:
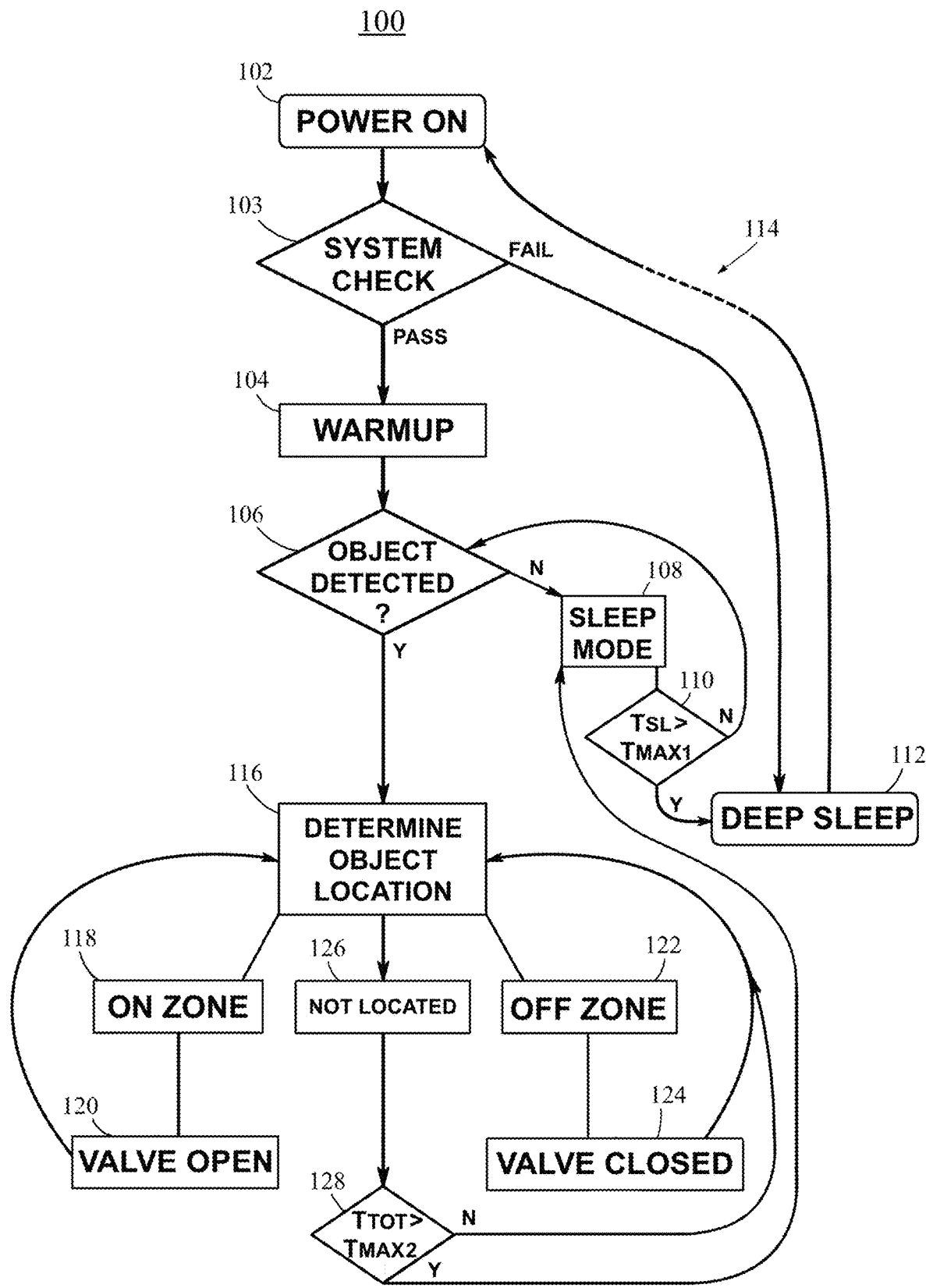
FIG. 3 is a flow chart of a first embodiment of a main control routine for a flow control system according to the present invention.

FIG. 3 is a flow chart diagramming salient steps of a basic embodiment of a main control routine 100 for the flow control system according to the present invention. The following description is made with regard to the flow control system 10 but applies equally to alternative embodiments, such as flow control system 50. In its simplest form, the main control routine 100 begins with receiving a power on signal 102. In preferred embodiments, the flow control system 10 can include a power button, such as a toggle switch or push button, or a virtual button that can be activated using a user interface such as a cell phone, to power on the system. Upon powering on at 102, the flow control system 10 advances to a warmup state 104 for a predetermined period of time. In the warmup state 104, the controller 12 maintains the valve 16 in an open position for a predetermined amount of time to allow the water to reach a desired temperature set by the operator. For example, the operator may adjust the main valve 4 or some other temperature control to the desired temperature. No data is processed during the warmup state 104. In some embodiments, the predetermined amount of time for the warmup state 104 may be programmed by an operator or the system can be preprogrammed by the manufacturer. The period of time for the warmup state 104 is preferably selected to allow water provided by the main water source 2 to reach the temperature set by an operator via the main control valve 4. The warmup state 104 may be set, for example, to thirty seconds, one minute, five minutes, or ten minutes depending on the rate at which the water will normally heat up to the desired temperature in the given showering environment 1 in which the system is deployed. In a more elaborate system, feedback control may be used to determine when water flowing through valve 16 achieves the desired temperature. For example, an in-line pressure and temperature sensor (not shown) at or near valve 16 may be configured to measure water temperature and transmit a signal representing this temperature to the controller 12. The controller may be configured to compare the sensed temperature to the desired temperature and take action when the sensed temperature reaches or exceeds the desired temperature.

After expiration of the warmup period in step 104, the system utilizes a preset minimum temperature to begin tracking an object within the showering environment. The inventors have determined that setting a minimum temperature between 70-80° Fahrenheit for tracking object movement allows the system to accurately predict a user's location even when taking a cold shower. Without the minimum temperature threshold, users who enjoy cold showers will experience glitches in the system after the warmup period because the maximum temperature detected by the system prior to user entry will be around the drain, which is normally located in the on zone. This would problematically cause the system to maintain the valve open even when no user is present.

Upon expiration of a preset time for the warmup state 104, or when otherwise determining that the desired water temperature has been reached, the controller advances routine 100 to the next step 106 where the controller 12 determines whether an object is detected in the shower area 5. If no object is detected, the flow control system 10 reverts to a sleep mode in step 108 where data is processed by the controller 12 at a decreased rate, e.g., every 5 seconds versus every 1 second in an active mode such as in step 116. Such data processing while in sleep mode 108 means that the process loops back to step 106 at the decreased rate, as shown, to periodically query the system for detection of an object. The flow control system 10 will remain in sleep mode 108 for a preset period time or until an object is detected in the shower area 5. If no object has been detected prior to the expiration of the preset period of time, i.e., time elapsed since entering sleep mode, $T_{SL}$, exceeds preset maximum time $T_{MAX1}$, the system 10 goes into a deep sleep at step 112 where no data is collected. To wake the system from the deep sleep 112, a power on signal must be re-initiated, e.g. manually or by other automated means, indicated generally by the dashed lines at 114, to loop process 100 back to step 102 to restart the power on cycle. Further, if at any time while in sleep mode 108, the system 10 detects an object within the showering environment (e.g., when periodically querying at step 106 at the decreased sampling rate), the process 100 advances to step 116 for determination of the object location.

At step 116, the controller 12 determines the location of the object within the shower area 5. In preferred embodiments, the controller 12 logically splits the array of infrared sensors 14 into an "on zone" and an "off zone" and stores these zones in the memory of the controller 12. The "on zone" corresponds to a selection of the individual sensors from the array 14 that correspond to the portion of the shower area 5 where a person would normally stand when actively rinsing and washing with water from the shower head 3. For example, the on zone normally corresponds to the forward portion of the shower area 5, i.e. the area closest to the shower head in a conventional showering environment 1. Similarly, the off zone corresponds to the individual sensors from the array 14 that correspond to the portion of the shower area 5 where a person would normally stand when lathering or shaving away from the direct discharge of the shower head 3. The off zone is typically the back portion of the shower area 5 in a conventional showering environment 1. At step 116, the controller 12 determines one of three possibilities regarding the location of the detected object: whether the detected object lies within the on zone (step 118); whether the detected object lies within the off zone (step 122); or whether the detected object is no longer detected in either the on zone or the off zone (step 126).

At step 118, the controller 12 has detected the object within the on zone and advances the process to step 120 to maintain the valve 16 in an open position. With the valve 16 open, the object detected within the on zone of the showering environment 1 is exposed to a continuous flow of water from the shower head 3, while process 100 periodically loops back to step 116 to query again for the object location. In this manner, steps 116 to 120 can be repeated until the controller 12 determines the object has moved out of the on zone.

At step 122, the controller has detected the object within the off zone and advances the process to step 124 to maintain the valve 16 in a closed position. With the valve 16 closed, water that would otherwise miss the object and be wasted down the drain is instead conserved. While valve 16 is closed, the process 100 periodically loops back to step 116 to query again for the object location. In this manner, steps 116 to 124 can be repeated until the controller 12 determines the object has moved out of the off zone.

At step 126, the controller cannot locate the object in either the on zone or the off zone and advances the process to step 128. Step 128 is a decision block, which compares the total time elapsed, $T_{TOT}$, since the process advanced to step 126 to a predetermined maximum time, $T_{MAX2}$. If the time elapsed, $T_{TOT}$, is not greater than $T_{MAX2}$, then the process loops back to step 116 to query again for determining the object location. As long as the object location is not located, and as long as the $T_{TOT}$ is not greater than $T_{MAX2}$, the process will loop between steps 116 and 128 without altering the position of the valve 16. In an alternative embodiment, the controller 12 can close the valve 16 at step 126 and maintain the valve closed until the process instructs otherwise. If, however, at block 128 $T_{TOT}$ is greater than $T_{MAX2}$, the process loops back to step 108 to enter into sleep mode.

Figure 4:
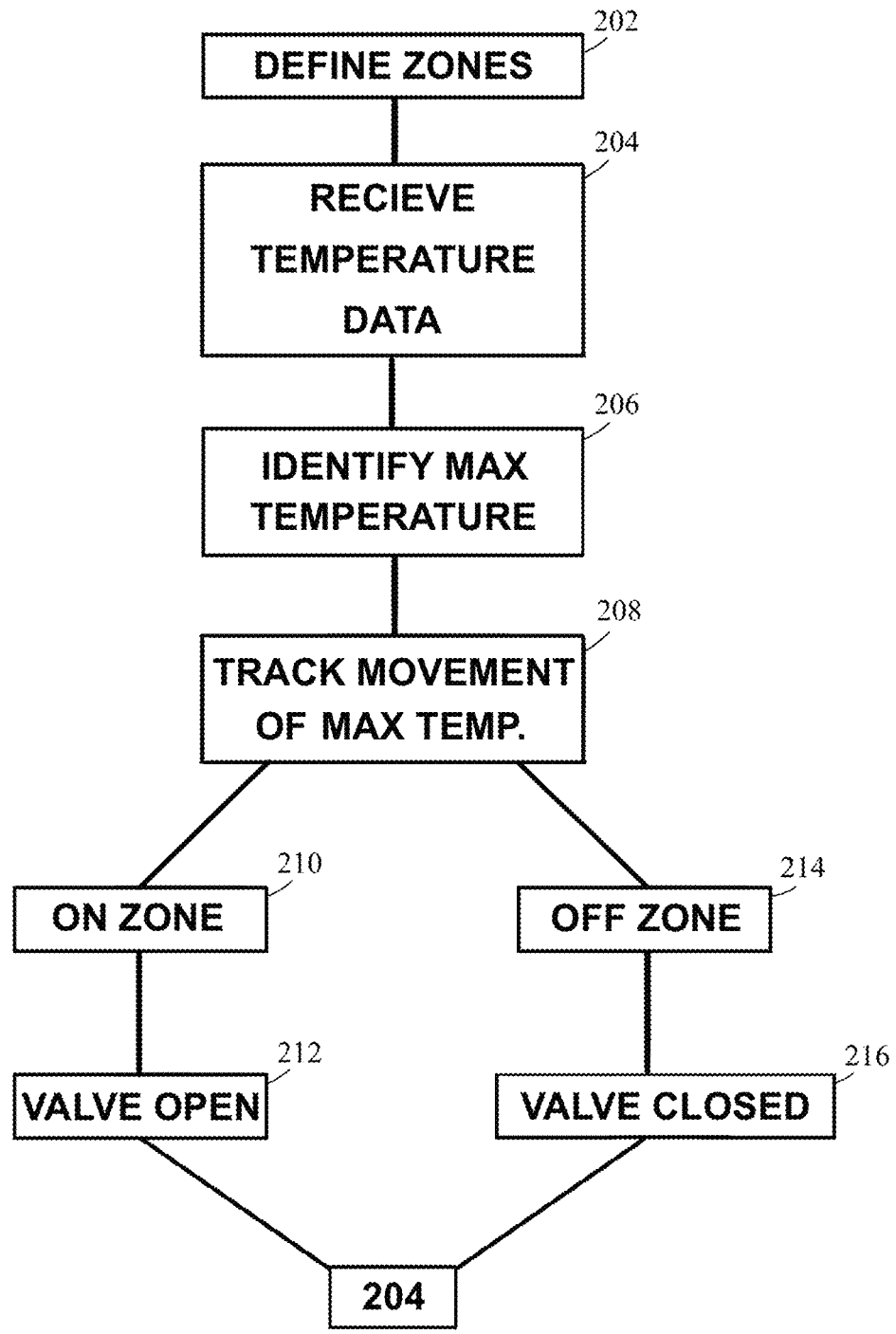
FIG. 4 is a flow chart of a first embodiment of an object tracking routine for a flow control system according to the present invention.

FIG. 4 is a process flow chart diagramming salient steps of another exemplary routine executable by the controller 12 for detecting the presence of an object within the shower area 5 according to the present invention. The routine 200 can be used by either embodiment of the flow control system 10 or 50 described above and the flow control system 600 described below. The controller 12 logically splits the array of infrared sensors 14 into the on zone and the off zone, as described above, prior to initiation of routine 200.

The inventors have determined that tracking certain datapoints can reliably predict when an object is present within the showering environment. Further, the inventors have determined that by tracking these datapoints, the system can accurately predict movement of an object between the on and off zones within the showering environment and thus determine when it is appropriate to turn the water on or off, while the object is still present within the showering environment. The inventors have experimentally determined that the maximum temperature sensed by the array of infrared sensors is one such datapoint that can improve the reliability of predicting object movement. The indication of maximum temperature by one or more sensors in the array almost always corresponds to the presence of a person and can therefore be used advantageously to predict with high accuracy the location of that person in a particular zone within the showering environment and thereby allow the controller executing an appropriate algorithm to determine when it is most appropriate to open and close the valve 16. Further, as briefly discussed above, the system utilizes a minimum temperature threshold when tracking object movement and identifying the maximum temperature. Temperatures that fall below the minimum temperature threshold will be disregarded by the system, even when that datapoint represents the actual maximum temperature being actively detected by the system. In such a scenario, the valve will be maintained in a closed position until the system detects a maximum temperature that is above the minimum temperature threshold and within the on zone.

Routine 200 starts at step 202 with the controller mapping or logically defining the "on zone" and the "off zone" to portions of the sensors within the sensor array, and storing this information as a digital map in the memory of the controller. In an alternative embodiment, the mapping of sensors to these zones is predetermined, e.g., by the system manufacturer or operator, and programmed into the memory. Routine 200 thereafter advances to step 204, in which the controller 12 receives temperature data from each individual sensor in the array of infrared sensors 14. At step 206, the controller analyzes the temperature data received to identify the individual sensor or sensors which detected the maximum temperature from among the array of infrared sensors 14. During step 206, the controller is also analyzing the temperature data received for comparison with the minimum temperature threshold. If the maximum identified temperature falls below the minimum temperature threshold, the system does not advance to the next step. The routine 200 does not advance to the next step until the identified maximum temperature exceeds the minimum temperature threshold.

Routine 200 then advances to step 208 where the controller 12 tracks movement of the maximum temperature throughout the array of infrared sensors and compares results of that movement to the map of the on and off zones. When the maximum temperature is tracked to a sensor in the predefined on zone, the process advances to step 210, which represents detection of object presence within the on zone. Thereafter, at step 212, the controller 12 commands the valve 16 to open or remain open. Alternatively, when the maximum temperature is tracked to a sensor in the predefined off zone, the process advances to step 214, which represents detection of object presence within the off zone. Thereafter, at step 216, the controller 12 commands the valve 16 to close or remain closed. Regardless of whether the valve is opened at step 212 or closed at step 216, the process cycles back to step 204, to repeat the routine. Preferably, the controller 12 executes routine 200 at a frequency at or no less than about once per second, to minimize water waste.

Figure 5:
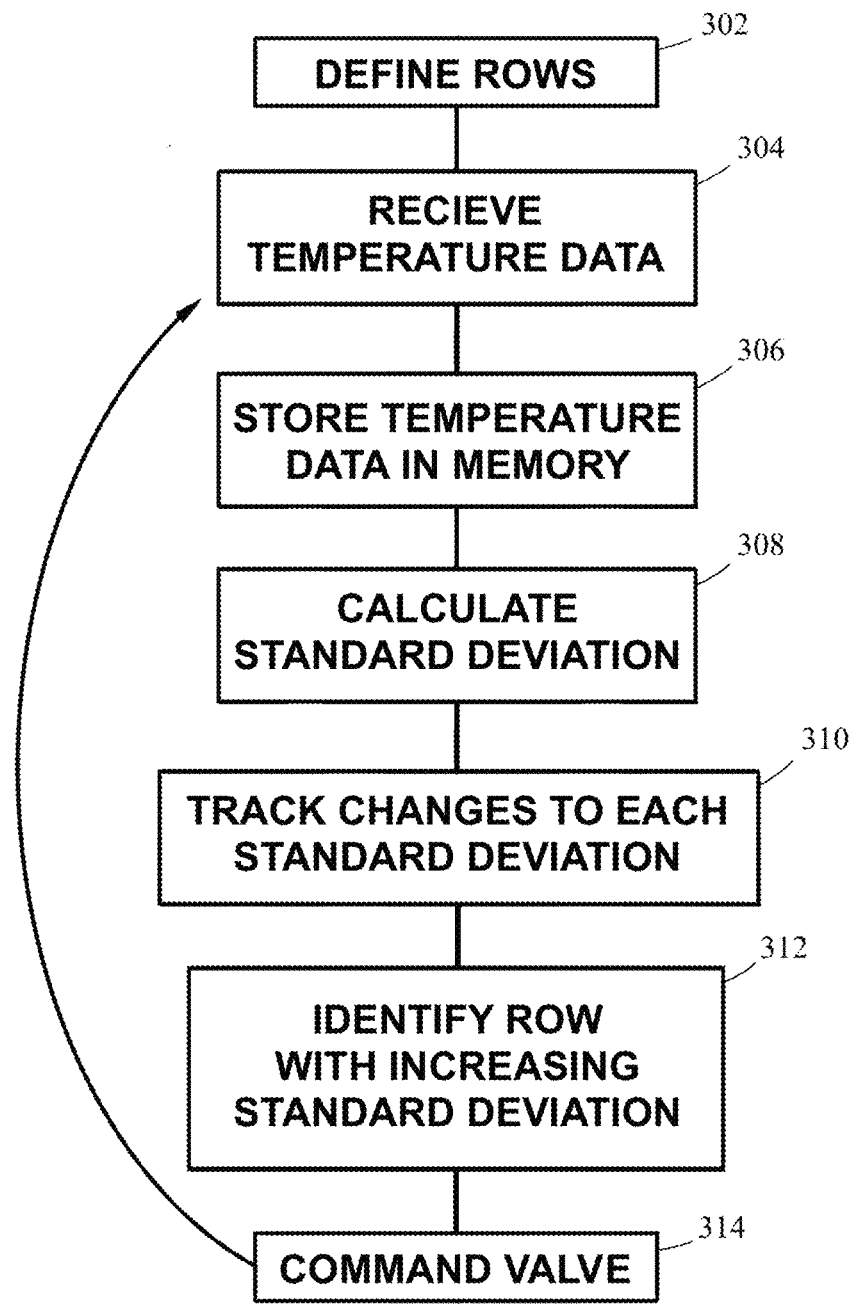
FIG. 5 is a flow chart of a second embodiment of an object tracking routine for a flow control system according to the present invention.

FIG. 5 is a flow chart diagramming the salient steps for a third routine 300 stored in the memory of and executable by the controller 12 for tracking temperature changes among the array of infrared sensors 14 according to an embodiment of the present invention. Similar to use of the maximum temperature datapoint with regard to routine 200, the inventors have determined that tracking movement of an object in the showering environment according to changes in temperature sensed by the individual sensors from the array of infrared sensors can be accomplished more reliably by using various statistical methods. Routines 300 and 400 illustrate two such statistical methods.

Routine 300 begins with step 302 where the controller 12 maps on rows and off rows among the array of infrared sensors 14, in a manner similar to as previously described. At step 304 the controller 12 begins receiving temperature data from each individual sensor in the sensor array 14. The controller 12 at step 306 stores the temperature data for each individual sensor in the memory of the controller 12 to generate a sequential history of temperature data sampling for each individual sensor. In a preferred embodiment, the sequential history of temperature data sampling may consist of a running window of samples, with the sampling starting whenever the system is powered on, e.g. at process 100 step 102. The width of the sampling window may be predefined as a sampling time (e.g. samples taken in the previous 10 seconds) or may be predefined as a number of samples (e.g. the 10 most recent samples taken).

In step 308, a standard deviation is calculated for each sensor using the sampling history of temperature data for that sensor. At step 310, the routine tracks changes, e.g., increases or decreases, to the calculated standard deviation and stores this data in memory. Next, at step 312, the controller by reading data stored in the previous step can identify each row of sensors that is experiencing a net increase in standard deviation, which corresponds to movement of an object into or out of the zone mapped to that row. The process can then take action at step 314 to command the valve to change state. As a basic example, in one scenario the valve 16 is open because an object had been previously detected in the on zone, at least because a particular row A in the on zone sensed a high temperature relative to another row B in the off zone. Given this initial condition, the object then begins to move from the on zone into the off zone, and as a result, the standard deviation of temperature samples taken from sensors in row A over the width of the sampling window increases and, after a short time delay, the standard deviation of temperature samples taken from sensors in row B similarly increases. By knowing the initial condition before the changes in standard deviations, or by knowing the time delay between changes in standard deviation from row to row, the controller at step 312 can determine a direction of movement of an object within the showering environment (on zone to off zone or vice versa), and more accurately determine presence of that object in either zone. Accordingly, at the final step 314, if the controller 12 detected movement from one zone to the other, it commands the valve 16 to change state. After the controller 12 has sent its signal to the valve 16, routine 300 loops back to step 304 and repeats the process.

In various embodiments, the controller 12 may execute routine 300 on the order of every 10 milliseconds, every 100 milliseconds, or every 1 second, while the flow control system 10 is active. In alternative embodiments, routine 300 may be executed at higher or lower rates depending on the need of the user and use of the flow control system 10. Further, routine 300 may be executed at a decreased rate (or not at all) when the flow control system 10 has reverted to a sleep mode, such as in step 107 of routine 100. In such embodiments, routine 300 may be executed every 5 seconds, 10 seconds, 100 seconds, etc.

Figure 6:
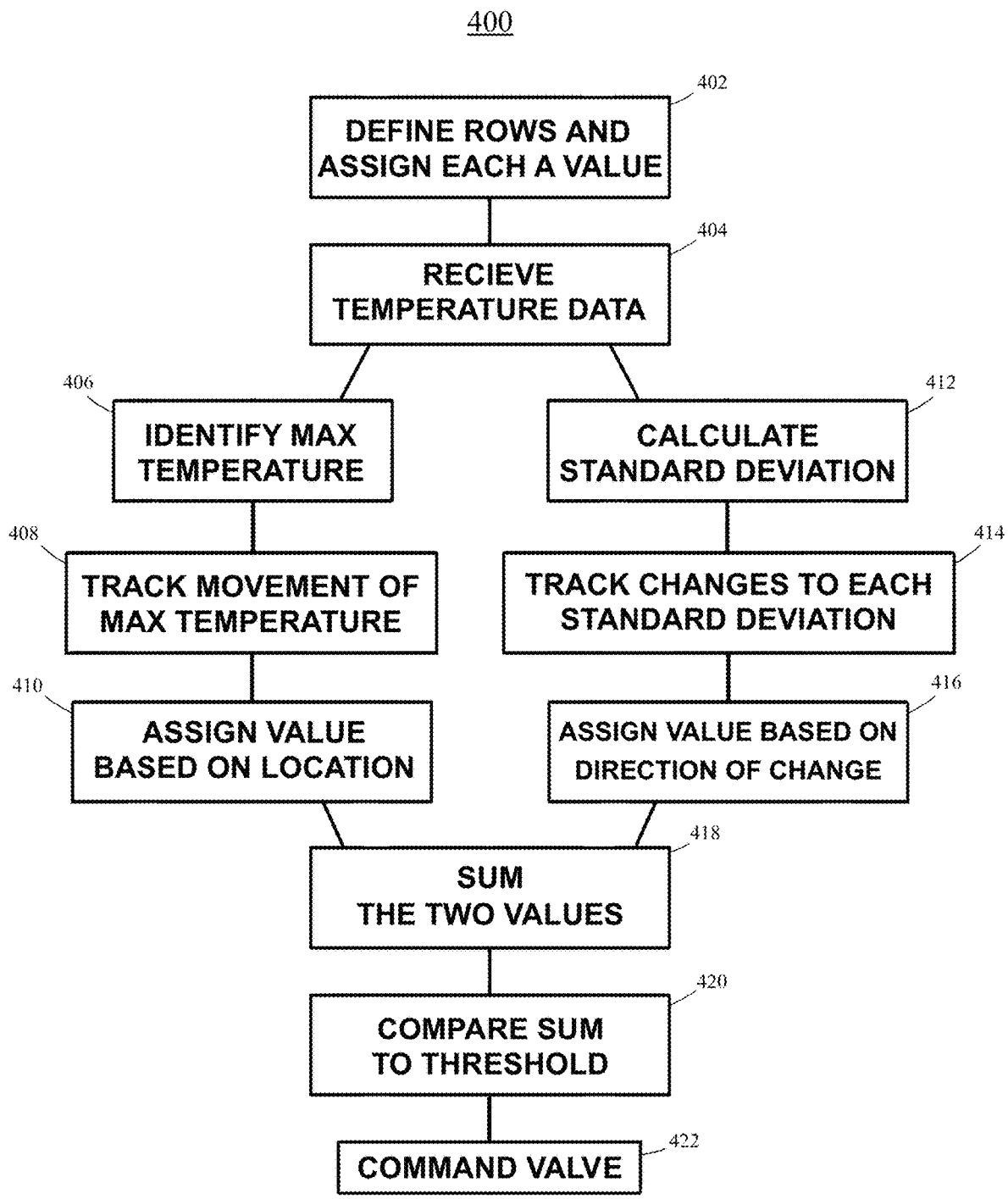
FIG. 6 is a flow chart of a third embodiment of an object tracking routine for a flow control system according to the present invention.

FIG. 6 is a process flow chart diagramming the salient steps for one embodiment of a weighted control routine 400 according to the present invention. The weighted control routine 400 combines aspects of the routine 200 and the routine 300 to more accurately predict the object's location within the shower environment 1. The weighted control routine 400 may logically correspond to step 106 of the main routine 100. Combining the main control routine 100 with the weighted control routine 400 thus results in step 106 and steps 116 to 124 being replaced with the weighted control routine 400. The steps of the weighted control routine 400 are described in the following paragraphs.

The weighted control routine 400 begins at step 402 with the controller 12 logically defining on rows, off rows, and grey rows amongst the array of infrared sensors 14. FIG. 7 is an exemplary layout of the array of infrared sensors 14 with the controller applied logic mapped to each individual row of sensors for ease of understanding the weighted control routine 400. The array 14 illustrated by FIG. 7 is an eight by eight array of passive infrared sensors, as described above. Note, the showerhead 3 is also included in FIG. 7 to orient the reader with regard to the array 14 mapped in FIG. 7 in a showering environment 1. As can be seen in the exemplary layout for the array 14 illustrated by FIG. 7, the controller defines the on rows as those rows closest to the showerhead 3 and the off rows as those rows furthest away from the showerhead 3. The grey rows correspond to the middle rows between the on and off rows. During step 402, the controller 12 also assigns a value to each of the defined rows. For instance, the on rows are assigned a (+5) value and the off rows are assigned a (−5) value. The grey rows are split into positive and negative rows and assigned a value of (2) so that one grey row corresponds to a (−2) value and the other grey row corresponds to a (+2) value. In this example, the negative grey row is closest to the off rows and the positive grey row is closest to the on rows. The layout of the array of infrared sensors 14 defined by the controller 12, including the definition and value assigned to each row such as the illustrative example provided in FIG. 7, is stored in the memory of the controller 12. In some preferred embodiments, during step 402 the controller 12 can also pre-mark the outer columns in the sensor array 14 with an "ignore" label, instructing the controller 12 to ignore the data received from the sensors corresponding to these columns. The inventors have determined that data received from sensors in these outer columns of the sensor array 14 often confuses the outcome of routine 400 due to the rapid fluctuations of the temperature in these areas of the showering environment caused by steam and condensation accumulating on the walls and curtain of the enclosure 6. In alternative embodiments, these outer columns from the sensor array 14 may be accounted for and utilized by the controller 12 when executing routine 400. In other implementations, there may be other reasons to ignore some sensor data, such as wherever the geometric shape of the sensor array does not align sufficiently with the geometry of the showering environment. Accordingly, a control routine according to the invention may be configured to ignore data received from individual sensors defined by row and column.

In step 404, the controller 12 receives temperature data from the array of infrared sensors 14, that is, from each individual sensor in the array. Steps 406 through 416 are preferably executed over the same time span by the controller 12. Steps 406 through 410 are similar to routine 200 whereas steps 412 through 416 are similar to routine 300. The following description of steps 406 through 416 should be read in view of the preceding disclosure.

In step 406, the controller 12 identifies the individual sensor that corresponds to the maximum temperature detected among the array 14. Again, routine 400 utilizes a minimum temperature threshold so that any temperature below the minimum threshold is ignored for purposes of identifying the maximum temperature. This minimum temperature threshold is discussed further above. In step 408, the controller 12 tracks movement of the maximum temperature throughout the array 14 to determine the row in which the maximum temperature is located. In step 410, the controller 12 assigns a value, $W_{MAX}$, to the maximum temperature based on the location of the maximum temperature in the predefined rows. For instance, if the output of step 408 is that the maximum temperature has been tracked to On Row 8 (FIG. 7), the controller 12 assigns a value of +5 to $W_{MAX}$. Alternatively, if the output of step 408 is that the maximum temperature has been tracked to Off Row 1, the controller 12 assigns a value of −5 to $W_{MAX}$. Or, if the maximum temperature is detected in Grey Row 4, $W_{MAX}=-2$; if the maximum temperature is detected in Grey Row 5, $W_{MAX}=+2$.

In steps 412 through 416, the controller 12 calculates the standard deviation for each individual sensor among the array of infrared sensors 14 (step 412) and thereafter tracks changes to the standard deviation for each individual sensor (step 414). Similar to routine 300, a net increase to the standard deviation for a given row of infrared sensors indicates movement detected by those sensors. Based on an initial condition, or on time delay in standard deviation change from one row to the next, the direction of movement is determined and a weighting value assigned. For example, in step 416, the controller assigns a value, $W_{STD}$, to represent the direction of movement or equivalently, the direction of change of standard deviations among the rows, such that movement in the direction from On Rows toward Off Rows results in the controller 12 assigning $W_{STD}$ a value of −3; whereas movement in the opposite direction from Off Rows to On Rows results in the controller 12 assigning $W_{STD}$ a value of +3.

In step 418, the controller 12 sums together the values $W_{MAX}$ and $W_{STD}$ assigned in steps 410 and step 416 to obtain the weighted output, $W_{OUT}$. In step 420, the controller compares the weighted output with a threshold value, $V_T$, to determine the command to be sent to the valve in step 422. In a preferred embodiment, the threshold value $V_T$ may be preset to zero (0) so that any weighted output greater than 0 results in the controller sending a command to the valve 16 to open or remain open. Similarly, any weighted output less than 0 results in the controller commanding the valve to close or remain closed.

In one example, with the valve 16 open, the routine detects a maximum temperature on Row 8, and standard deviations indicating movement in the direction from the on zone to the off zone. The controller 12 therefore assigns $W_{MAX}=5$ and $W_{STD}=-3$, and in step 418 calculates their sum as $W_{OUT}=+2$. The controller in step 420 compares $W_{OUT}$ (+2) to $V_T$ (0) and returns a positive number, and so in step 422 commands the valve 16 to remain open. In another example, with the valve 16 closed, the routine detects a maximum temperature on Row 4, and standard deviations indicating movement in the direction from the off zone to the on zone. The controller 12 therefore assigns $W_{MAX}=-2$ and $W_{STD}=+3$, and in step 418 calculates their sum as $W_{OUT}=+1$. The controller in step 420 compares $W_{OUT}$ (+1) to $V_T$ (0) and returns a positive number, and so in step 422 commands the valve 16 to change state from closed to open.

It should be understood that the various weighting values discussed above are exemplary only, that the size and geometry of the sensor array, and that the complexity of the weighting algorithm has been simplified in the foregoing examples for purposes of illustration. Other more varied weighting schemes, arrays, and weighting algorithms are possible within the scope of the invention, all of which amount to variations on methods according to the invention to determine the state of the valve under control as a function of one or more of (1) the location of the maximum temperature sensed in the sensor array, (2) a statistic such as standard deviation derived from among a sampling of sensed temperatures from one or more sensors in the array, and (3) the direction of movement of an object detected by the sensor array. Other statistics that can be used to control the valve include a variance derived from the sampling of sensed temperatures, and a rate of change of the speed or direction of movement of the object detected by the array.

In some cases, $W_{OUT}$ may be equal to the threshold value $V_T$, which causes the flow control system 10 to maintain its present status so that if the valve is already open, it remains open (and vice versa). In preferred embodiments, step 404 through step 422 are executed periodically while the flow control system 10 is powered on and active. Step 404 through step 422 may be executed at any desired rate, e.g. every millisecond, every 10 milliseconds, every 100 milliseconds, every 1 second, etc. while the flow control system 10 is activated.

Figure 8A:
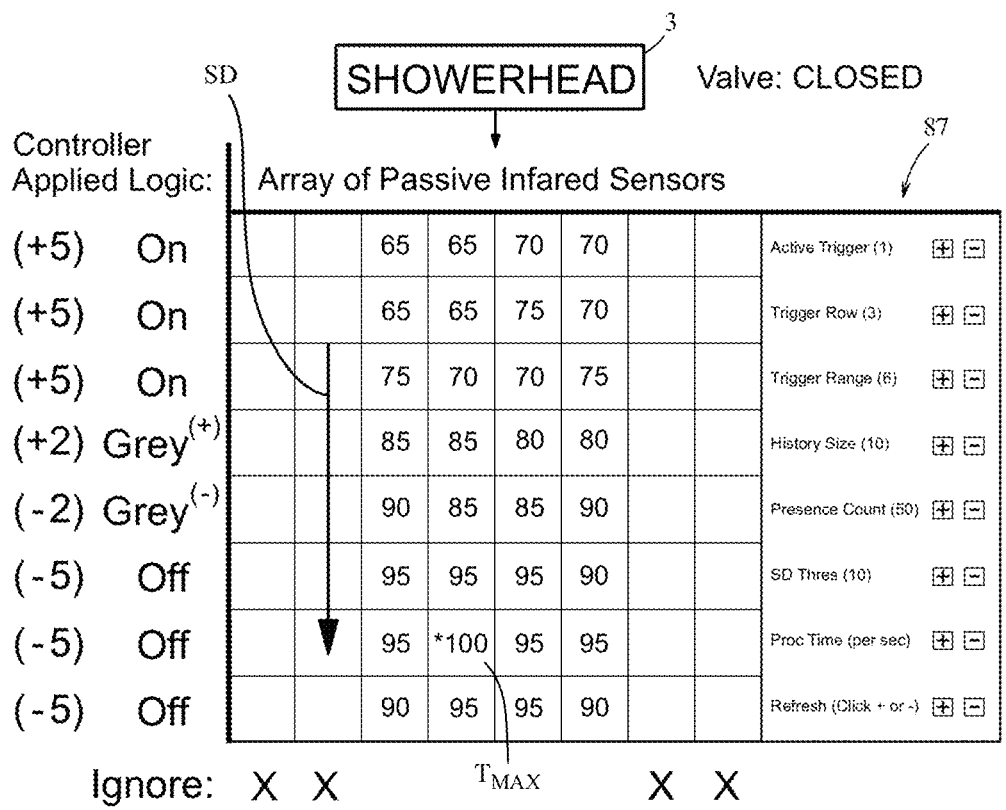
FIGS. 8A and 8B are grid representations showing object movement within a showering environment, the object being tracked by the flow control system according to the present invention.
Figure 8B:
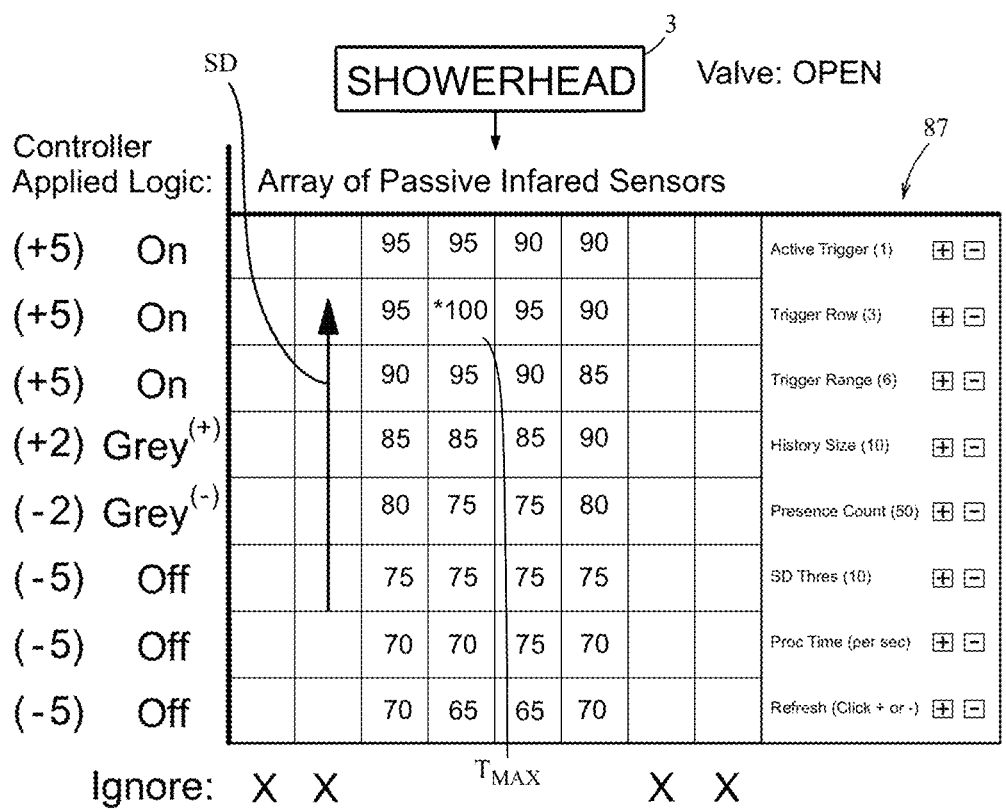

FIGS. 8A and 8B are grid views of the various outputs from one or more of the routines described herein for the flow control system according to the present invention. On the right side of the figures, the flow control system parameters 87 are listed. These parameters 87 may be customized by a user or preset by the manufacturer. For instance, the Active Trigger parameter refers to the specific algorithm to be executed by the flow control system, e.g., one of routine 200, 300 or 400. The Trigger Row parameter refers to the location of the on zone and off zone within the overall grid. This also may be customized by a user or preset by the manufacturer. The Trigger Range refers to the controller applied logic that is applied to the on zone and off zone, e.g., cells in the on zone are given a +5 value while cells in the off zone are given a −5 value. The Trigger Hysteresis parameter refers to the lag time between the controller sending a command to the valve and the valve actually opening and closing in response. This is currently set to one second but may be decreased to obtain a quicker reaction time. The Presence Count parameter refers to a preset threshold number of occurrences for the system detecting no object within the showering environment before reverting to a deep sleep or powering down. The SD Threshold parameter refers to the standard deviation value that is needed for the system to determine an object is present. Increasing this number requires more object movement for accurate detection. The COG parameter refers to the manner in which the standard deviation is utilized by the flow control system. For instance, a COG value of one informs the flow control system to track the exact location of the standard deviation in relation to the trigger location while a value of two informs the flow control system to track the forward and backward movement within the grid of the calculated standard deviation. The Processor Time parameter refers to number of times per second the flow control system takes the temperature calculations to process an on and off command to the valve.

FIGS. 8A and 8B illustrate the different readings the controller 12 makes when executing one or more of the routines 100, 200, 300 and 400. The primary difference between FIG. 8A and FIG. 8B is the location of the object, i.e., person, within the showering environment, as indicated by the heat signals detected by the sensor array 14 that are communicated to the controller 12 for processing. The numbers displayed in the grid illustrated by FIGS. 8A and 8B are representative of the temperature readings the controller 12 may receive from the sensor array 14. Each cell within the grid is assigned a temperature value representative of the heat signal detected by that individual sensor in the sensor array 14 and communicated to the controller 12. Each heat signal is therefore detected from a distinct portion of the showering environment. It should be understood that actual temperature values obtained from the individual heat signals will vary based on the showering environment and the user-set water temperature for the shower. The values illustrated in FIGS. 8A and 8B are no way meant to be limiting and are presented only for illustrative purposes.

FIG. 8A illustrates an example of a grid view where the valve is closed. The maximum temperature $T_{MAX}$ is identified in an off row and assigned a value of (−5). The arrow on the left side of the figure identifies the direction of movement of the object as determined by the standard deviation calculated for the sensed temperature of each individual sensor in the sensor array 14. FIG. 8A is a snapshot of a single sampling window and therefore cannot show the calculated change to standard deviation for each sensor. However, as detailed further above, it should be understood that direction of movement can be determined by the controller 12 based on the change to the standard deviation with knowledge of its initial condition or the time delay between samplings. As shown in FIG. 8A, as an object begins to move from the on zone in the front portion of the showering environment to the off zone in the rear part of the showering environment, the calculated standard deviation will initially increase in the on zone but quickly diminish as no movement is detected by sensors corresponding to that area. Similarly, the calculated standard deviation in the off zone will quickly increase and remain elevated so long as the object remains in the off zone and continues to move.

Each cell in the illustrated grid, and thus each sensor in the sensor array 14, may be assigned a value for a calculated change to the standard deviation. For instance, the cells corresponding to the on zone may be assigned a (+3) value while the cells corresponding to the off zone may be assigned a (−3) value. The intermediate zones may be given a (+1) value in the on zone and a (−1) value in the off zone. These values are used in routine 400 for determining whether to open or close the valve, as discussed in more detail above.

FIG. 8B illustrates an example of a grid view where the valve is open. The max temperature $T_{MAX}$ is identified in the on zone. Similarly, the calculated change to the standard deviation indicates movement in the direction of the on zone. As discussed above, the standard deviation will initially increase in the off zone as the object begins moving toward the on zone. Thereafter, the standard deviation calculated in the off zone will quickly diminish due to a lack of movement while the calculated standard deviation in the on zone increases and remains at an elevated level due to the object being present and moving in that area. The controller 12 having knowledge of the initial condition of each cell and/or knowledge of the sampling window is able to determine the direction of movement within the showering environment based on the calculated change to the standard deviation for each cell.

Figure 9:
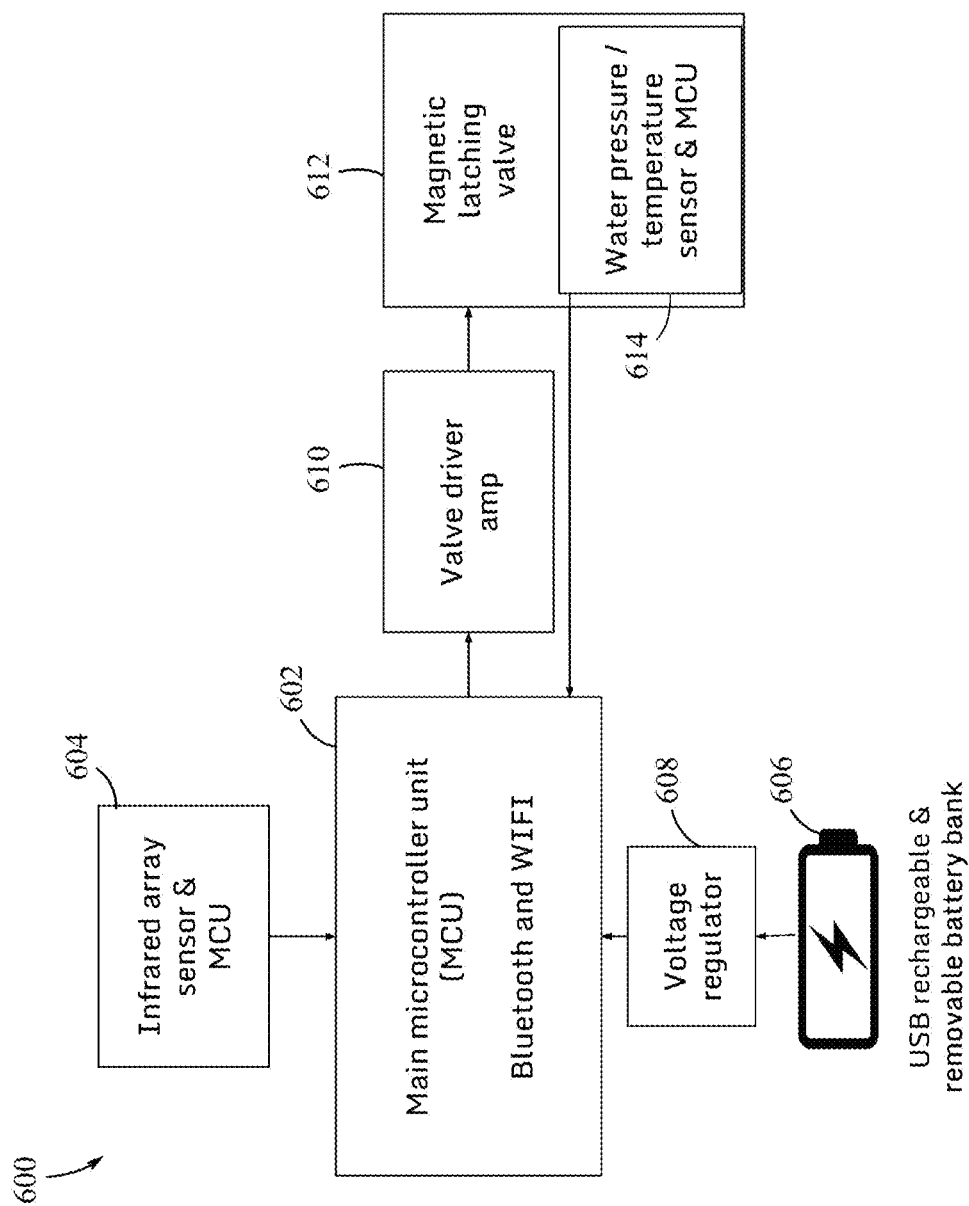
FIG. 9 is a block diagram of a further embodiment of a flow control system according to the present invention.

FIG. 9 is a block diagram of a further embodiment of a flow control system according to the present invention. The flow control system 600 has many similar components to that detailed above with regard to system 10 and system 50. Flow control system 600 is a more elaborate embodiment of system 50, as will be detailed further below with regard to FIG. 10. It should be understood that all object tracking operations and control processes described above with respect to system 10 and 50 apply equally to flow control system 600. Thus, each of the main control routine 100 and all of the flow control routines 200, 300 and 400 described above are fully executable by the flow control system 600.

The flow control system 600 has a main control unit 602 that is electrically coupled to a sensor array 604. A power source 606, such as a rechargeable battery pack, is electrically coupled to the main control unit 602 and the sensor array 604. There may be a voltage regulator 608 coupled between the power source 606 and the main control unit 602. A valve driver amplifier 610 is electrically coupled to the main control unit 602 and to a magnetic latching valve 612. The valve driver amplifier 610 amplifies or steps up the voltage output from the main control unit 602 to the required voltage for the magnetic latching valve 612. A water pressure and/or temperature sensor 614 may be positioned inside the magnetic latching valve 612, to detect water pressure in the main water line and the temperature of such water.

In the simplest form, flow control system 600 involves the sensor array 604 sending a signal to the main control unit 602. Upon receiving the signal, the main control unit 602 sends a pulse through the valve driver amplifier 610, which steps up the pulsed voltage to a level appropriate to cause a change of state in the magnetic latching valve 612. In one example, the main control unit 602 sends out a 3.6V pulse (based on the voltage of the power source 606) which the valve driver amplifier 610 then steps up to a +/−5V output to the valve 612. Upon receiving the +/−5V output from the valve driver amplifier 610, the energized coil creates an electromagnetic field that will either push or pull the valve plunger to open or close the valve, i.e., change state. An internal magnet maintains the valve plunger in its operative position, i.e., open or close, until the magnetic latching valve 612 is pulsed again by the main control unit 602.

In some preferred embodiments, the main control unit 602 is an ESP32 model processor, designed by Espressif Systems and the magnetic latching valve 612 is Model 211D, DC 4.5V, designed by GOGO Automatic Company Ltd. The sensor array 604 is preferably the AMG8833 Infrared Array Sensor Grid-Eye manufactured by Panasonic Industry Co., Ltd. The water pressure and temperature sensor 614 is preferably the MS5837-02BA digital pressure and temperature sensor manufactured by TE Connectivity Sensors. However, it should be understood that commercial embodiments of the present invention may utilize various other makes, models, or components from other manufactures to achieve the same goals.

Figure 10:
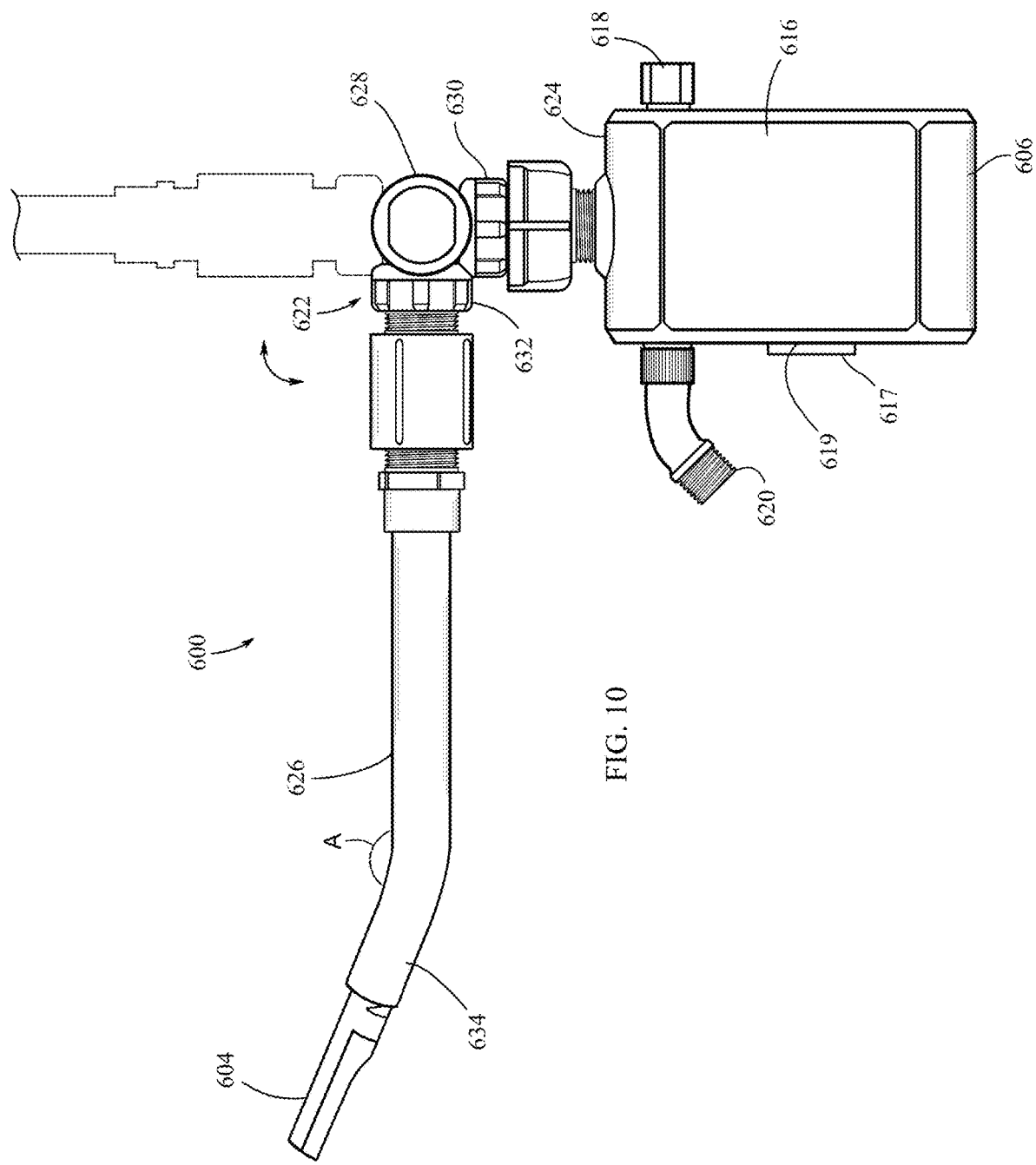
FIG. 10 is a perspective side view of a further embodiment of a flow control system according to the present invention.

FIG. 10 is a side view of an embodiment of a flow control system according to the present invention. FIG. 10 illustrates an embodiment of the flow control system 600, which is similar to system 50 described above in that system 600 is not ceiling mounted but instead utilizes a boom to position the sensor array 604 within the showering environment. The flow control system 600 includes a housing 616 which encloses, in a watertight environment, each of the main control unit 602, power source 606, voltage regulator 608, and valve driver amplifier 610. The power source 606 may be a removable battery or battery pack, such as a NiCD 4000 mA battery like those commonly found in digital cameras or other small electronics, or a similar amperage lithium-ion battery pack. The magnetic latching valve 612 is electrically coupled with the main control unit 602 and is further positioned within the housing 616 and fluidically connects an inlet end 618 with the outlet end 620. The pressure/temperature sensor 614 is also enclosed within the housing 616 and may be positioned inside the body of valve 612 where its sensing elements are exposed directly to water flow, or it may be positioned outside the valve anywhere between the inlet end 618 and outlet end 620 wherever it can advantageously sense the temperature and pressure of water in the system. For example, a small hole can be drilled into the body of the magnetic latching valve 612 to the flow channel and the pressure/temperature sensor 614 can be positioned in the hole and sealed there using a silicone sealant. This maintains the water tight environment while exposing the sensor 614 to water flowing through the system 600.

The inlet end 618 is configured to be coupled with the main water source, e.g., water source 2 coming out of the wall within a showering environment 1. The outlet end 620 is configured with threads for coupling to a nozzle, such as shower head 3. The magnetic latching valve 612 fluidically connects the inlet end 618, and thus the water source 2, with the outlet end 620, and thus the shower head 3.

An adjustable boom 622 extends from a top surface 624 of the housing 616. The adjustable boom 622 couples the sensor array 604 with the main control unit 602 contained within the housing 616. More specifically, the adjustable boom 622 provides a waterproof conduit 626 for wiring that electrically connects the sensor array 604 to the main control unit 602 that is enclosed within the housing 616. In some embodiments, the conduit 626 is telescopically adjustable from the top surface 624 of the housing 616. More preferably, a detented hinge 628 rotatably couples the conduit 626 with the housing 616 and creates a rotational span for the adjustable boom 622 from about 0 degrees (position shown by FIG. 10) to about 90 degrees (shown by the dotted lines in FIG. 10), where the conduit 626 is shown extending substantially straight upward from the top surface 624 of the housing 616. The detented hinge 628 includes a stationary end 630 extending from the top surface 624 of the housing 616 and a rotating end 632 coupled thereto. The stationary end 630 preferably includes a plurality of detents that each correspond to a fixed angle and the rotating end 632 incudes two or more spring-loaded pins each configured to engage with one of detents, to allow a user to set the angle for the conduit 626 that extends forward from the rotating end 632. The angle of the conduit 626, and thus positioning of the sensor array 604 within the showering environment 1, may be changed by the user simply pushing or pulling on the rotating end 632 to set the angle anywhere between about 0 and 90 degrees. Each detent may correspond to any desired step of degrees, such as a 1-degree, 3-degree, or 5-degree angular change, depending on the number of detents present and amount of customization desired. The inventors have experimentally determined that an angle for the conduit 626 created by the detented hinge 628 between about 0 degrees and 30 degrees provides optimal results for most users in most showering environments.

The adjustable boom 622 allows the user to move the on and off zones without having to change or alter the code for the flow control system 600. The user simply adjusts the angle of the sensor array 604 using the adjustable boom 622 until the on zone corresponds to that area within the showering environment 1 that that specific user will utilize. A second user may need to further adjust the angle of the sensor array 604 for their own showering preferences.

In some embodiments, the conduit 626 may include a distal end 634 extending forward at a fixed angle A to couple with the sensor array 604. The angle A ensures that the sensor array 604 will point toward an area where a user is normally present instead of straight. This arrangement may also be used in an embodiment having a non-adjustable boom angle, i.e. where hinge 628 is omitted.

The housing 616 further includes a power button 617, preferably on the side of the housing 616 having the outlet end 620, that faces the user when the system 600 is in use. Further, a manual bypass switch 619 may also be included proximate the power button 617. The manual bypass switch 619 will override the system 600 to mechanically maintain the valve 612 in the open position allowing the shower to function normally. In some embodiments, the bypass switch 619 is mechanically coupled to the magnetic latching valve 612 so that upon activation of the bypass feature, the internal valve plunger is physically held in the open position. In some embodiments, the bypass switch 619 has an internal magnet that is positioned in close proximity to the magnet of the magnetic latching valve 612. When the bypass switch 619 is activated, the internal switch magnet is moved into position to exert a magnetic force on the internal valve magnet to maintain the valve in the open position.

Each of the control routines 100, 200, 300, and 400 are preferably coded in C++ source code and stored in the memory of the controller or control unit. Typically, certain definitions are defined in the code and stored in the controller memory. These include defining the on cells and the off cells, assigning values to each row of on cells and each row of off cells, setting the preset time period for the warmup feature, setting any processing delay times that may be required, setting the history or sampling size for calculating standard deviation, turning certain cells off (e.g., to ignore as shown in FIG. 7), and any other preset threshold values or time periods.

In one example, the algorithm for tracking only max temperature may be coded as follows:
Window=1 (adjustable from screen)
If Loc YMax Temp<=AdjustableLine Then Trigger Value++
If Loc YMaxTemp>AdjustableLine Then Trigger Value--
If TriggerValue<-Window then TriggerValue=-Window
If TriggerValue>Window then Trigger Value=Window
If TriggerValue>0 Then Output=1

In a further example, the algorithm for tracking max temperature and standard deviation as a pad may be coded as follows:
Window=5 (adjustable from screen)
If (Loc YMax Temp<=AdjustableLine & LocYSD<=AdjustableLine) then
TriggerValue=Window
If (Loc YMax Temp>AdjustableLine & LocYSD>AdjustableLine) then TriggerValue=-Window
If (Loc YMax Temp<=AdjustableLine & LocYSD>AdjustableLine) then TriggerValue++

If (Loc YMaxTemp>AdjustableLine & LocYSD<=AdjustableLine) then TriggerValue--
If TriggerValue<-Window then TriggerValue=-Window
If TriggerValue>Window then TriggerValue=Window
If TriggerValue>0 Then Output=1

In another example, an algorithm for tracking max temperature and a rolling standard deviation as a pad may be coded as:

Window=5 (adjustable from screen)
If (Loc YMax Temp<=AdjustableLine & LocYRSD<=AdjustableLine) then
TriggerValue=Window
If (Loc YMax Temp>AdjustableLine & Loc YRSD>AdjustableLine) then TriggerValue=-Window
If (Loc YMax Temp<=AdjustableLine & LocYRSD>AdjustableLine) then TriggerValue++
If (Loc YMax Temp>AdjustableLine & LocYRSD<=AdjustableLine) then TriggerValue--
If TriggerValue<-Window then TriggerValue=-Window
If TriggerValue>Window then TriggerValue=Window
If TriggerValue>0 Then Output=1

Additional algorithms for tracking object movement within a showering environment according to the present invention include:

OSDTriggerthreshold=(Settable from the screen)
SDTriggerthreshold=(Settable from the screen)
If OverallSumSTDEV>OSDTriggerthreshold or MaxStDev>SDTriggerthreshold then Output =1
If OverallSumSTDEV<OSDTriggerthreshold and MaxStDev<SDTriggerthreshold then Output =0
And:
OSDTriggerthreshold=(Settable from the screen)
SDTriggerthreshold=(Settable from the screen)
If OverallSumSTDEV>OSDTriggerthreshold or MaxStDev>SDTriggerthreshold then Output =1
If OverallSumSTDEV<OSDTriggerthreshold and MaxStDev<SDTriggerthreshold and OSDROC<0 then Output=0

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A flow control system for a showering environment having a water inlet and a discharge head, the system comprising:
   an electrically controlled valve fluidically connecting the water inlet to the discharge head;
   a sensor array having multiple sensors, each sensor directed to sense heat from a distinct location within the showering environment;
   a power source providing electrical power to the system; and
   a controller configured to receive a heat signal from each of the sensors, derive at least one statistic from among all of the heat signals, and open or close the valve according to the at least one derived statistic, wherein the at least one derived statistic comprises a maximum temperature.

2. The system of claim 1, wherein the controller further comprises a first routine deriving the maximum temperature, executable by the controller and stored in memory, for determining object presence within the showering environment, wherein the first routine comprises:
   (a) defining an on zone and an off zone in the sensor array and assigning each sensor to either the on zone or the off zone,
   (b) receiving temperature data from each sensor in the sensor array,
   (c) identifying a sensor corresponding to the maximum temperature,
   (d) tracking movement of a location of the maximum temperature throughout the sensor array, and
   (e) sending a signal to the valve responsive to sensing the location of the maximum temperature within the on zone and the off zone, wherein if the maximum temperature is located in the on zone, the controller signals the valve to open, and wherein if the maximum temperature is located in the off zone, the controller signals the valve to close.

3. The system of claim 2, wherein the first routine further comprises repeating steps (b) through (e) until the controller receives a power down command.

4. The system of claim 2, wherein the first routine further comprises repeating steps (b) through (e) for a predetermined period of time while location of the maximum temperature remains in the off zone, wherein upon expiration of the predetermined period of time the system reverts to a sleep mode where no temperature data is collected.

5. The system of claim 2, further comprising a warmup period prior to step (b), wherein the warmup period comprises receiving a power on signal and maintaining a standby state for a predetermined period of time where the valve is maintained open and no data is collected by the controller, wherein upon expiration of the predetermined period of time the controller advances to step (b) of the first routine.

6. The system of claim 5, wherein step (b) further comprises a minimum temperature threshold and the controller is configured to disregard temperature values that fall below the minimum temperature threshold.

7. The system of claim 1, wherein each sensor comprises a passive infrared sensor.

8. The system of claim 1, wherein the at least one derived statistic further comprises a standard deviation of temperature changes.

9. The system of claim 8, wherein the controller further comprises a second routine deriving the standard deviation of temperature changes, stored in memory and executable by the controller, for tracking temperature changes sensed by each sensor throughout the sensor array.

10. The system of claim 9, wherein the second routine comprises:
   (i) defining on rows and off rows among the sensor array and assigning each sensor to one of the on rows or one of the off rows;
   (ii) receiving temperature data from each sensor;
   (iii) storing in the memory a sequential reading of the temperature data from each sensor;
   (iv) calculating the standard deviation of temperature changes for each sensor from the sequence of readings for that sensor;
   (v) tracking changes to the standard deviation for each sensor;
   (vi) determining a direction of movement of an object based on the tracked changes to the standard deviation for each sensor; and (vii) sending a signal to change state of the valve responsive to the determined direction of movement of the object.

11. The system of claim 10, wherein the second routine further comprises repeating steps (ii) through (vii) until the controller receives a power down command.

12. The flow control system of claim 10, wherein the second routine further comprises repeating steps (ii) through (vii) for a predetermined period of time.

13. The flow control system of claim 10, further comprising a warmup period prior to step (ii), wherein the warmup period comprises receiving a power on signal and maintaining a standby state for a predetermined period of time where the valve is maintained open and no data is collected by the controller, wherein upon expiration of the predetermined period of time the controller advances to step (ii) of the second routine.

14. The flow control system of claim 1, wherein the valve is a normally open magnet latching solenoid valve.

15. A flow control system for a showering environment having a water inlet and a discharge head, the system comprising:
   a housing enclosing a magnet latching valve fluidically connecting the water inlet to the discharge head, a controller configured to command the valve, and a power source providing power to the system;
   a boom extending upward from the housing, wherein the boom has a detented hinge rotatably coupling the boom to the housing; and
   a sensor array attached to an end of the boom and positioned above the discharge head, the sensor array electrically coupled to the controller and having multiple sensors, each sensor directed to detect heat from a distinct location within the showering environment, wherein the controller is configured to receive a heat signal from each of the sensors, derive a statistic from among all of the heat signals, and open or close the valve according to the derived statistic.

16. The system of claim 15, wherein the derived statistic comprises a maximum temperature.

17. The system of claim 15, wherein the boom extends upward from the housing at a fixed angle.

18. A flow control system for a showering environment having a water inlet and a discharge head, the system comprising:
   an electrically controlled valve fluidically connecting the water inlet to the discharge head;
   a sensor array having multiple sensors, each sensor directed to sense heat from a distinct location within the showering environment;
   a power source providing electrical power to the system; and
   a controller configured to receive a heat signal from each of the sensors, derive a statistic from among all of the heat signals, and open or close the valve according to the derived statistic, wherein the derived statistic comprises a standard deviation of temperature changes.

* * * * *